(12) United States Patent
Tsushima

(10) Patent No.: US 7,916,809 B2
(45) Date of Patent: Mar. 29, 2011

(54) DIGITAL RECEIVER APPARATUS

(75) Inventor: Masahiro Tsushima, Saitama (JP)

(73) Assignee: Pioneer Corporation, Tokyo (JP)

( * ) Notice: Subject to any disclaimer, the term of this patent is extended or adjusted under 35 U.S.C. 154(b) by 951 days.

(21) Appl. No.: 10/594,724

(22) PCT Filed: Mar. 29, 2005

(86) PCT No.: PCT/JP2005/005951
§ 371 (c)(1),
(2), (4) Date: Sep. 29, 2006

(87) PCT Pub. No.: WO2005/096515
PCT Pub. Date: Oct. 13, 2005

(65) Prior Publication Data
US 2007/0136779 A1 Jun. 14, 2007

(30) Foreign Application Priority Data
Mar. 31, 2004 (JP) ................................ 2004-107285

(51) Int. Cl.
*H03K 9/00* (2006.01)
(52) U.S. Cl. ... 375/316; 375/324; 375/262; 375/240.25; 375/265; 375/240.27; 725/100; 725/135; 725/131; 725/39; 725/50; 348/465; 348/466; 348/463; 348/525; 348/14.03
(58) Field of Classification Search ............... 375/324, 375/262, 265, 340, 240.12, 240.25, 240.27, 375/240.01, 240.26; 725/100, 135, 131, 725/240.25, 240.02, 39, 50, 56, 60, 61, 93, 725/139; 348/465, 466, 463, 468, 525, 716, 348/725, 729, 14.13, 14.03, 14.07, 568; 455/135, 143, 154.1, 161.3, 187.1, 199.1, 227, 226.2
See application file for complete search history.

(56) References Cited

U.S. PATENT DOCUMENTS

| | | | | |
|---|---|---|---|---|
| 5,862,451 A | * | 1/1999 | Grau et al. | 725/116 |
| 6,609,251 B1 | * | 8/2003 | Yoneda | 725/71 |
| 2002/0129374 A1 | * | 9/2002 | Freeman et al. | 725/91 |

FOREIGN PATENT DOCUMENTS

| | | |
|---|---|---|
| JP | 2003-274302 A | 9/2003 |
| JP | 2004-032604 A | 1/2004 |

* cited by examiner

*Primary Examiner* — David C Payne
*Assistant Examiner* — Rahel Guarino
(74) *Attorney, Agent, or Firm* — Arent Fox LLP

(57) ABSTRACT

An object of the present invention is to provide a digital receiving apparatus for providing useful information to its user without interruption when reception quality deteriorates. It includes: an information separating unit 4 for reproducing a stream of demodulation signal S3, and separating it into stream signals S4 on multiplexed respective channels for output; a decoding unit 5 for decoding and outputting the stream signals S4; and a control unit 6 for switching and controlling a stream signal for the decoding unit 5 to decode out of the stream signals on the respective channels, and the control unit 6 switches to the stream signal on another channel and makes the decoding unit 5 decode it when physical information for indicating reception quality under reception and the data type of the stream signal on the channel selected out of the channels do not conform to a predetermined relationship.

7 Claims, 3 Drawing Sheets

DIGITAL RECEIVER APPARATUS

CROSS-REFERENCE TO RELATED APPLICATION

This application is a National Stage entry of International Application No. PCT/JP2005/005951 filed Mar. 29, 2005, which claims benefit of Japan Applications No. 2004-107285 filed Mar. 31, 2004, the entire specification claims and drawings of which are incorporated herewith by reference.

TECHNICAL FIELD

The present invention relates to a digital receiving apparatus which is compatible with, for example, a digital radio broadcast system, a digital television broadcast system, a digital communication system, an Internet-protocol based digital transmission system, or the like.

BACKGROUND ART

Recently, progresses have been made of digital transmission systems in which various kinds of information such as video, audio, and text data are multiplexed for transmission. For example, in ISDB (Integrated Services Digital Broadcasting) and the like, flexible service organization has been under way to address the diversification of services, aiming at integrated digital broadcasting where all information is handled as digital data.

In the meantime, digital receiving apparatuses for receiving transmission signals transmitted from broadcast stations have implemented measures that take account of reception quality. For example, digital receiving apparatuses mounted on mobile units such as an automobile have implemented measures for providing useful information to users without interruption even when the field intensity varies while moving due to the effect of buildings and the like, and when receiving incoming waves that cause various kinds of fading.

A digital broadcast receiving apparatus disclosed in Japanese Patent Application Laid-Open No. 2003-274302 receives radio waves of a multicarrier modulation transmission method transmitted from a broadcast station, and selects and demodulates a modulation signal that is modulated by a modulation method of higher error tolerance when undergoing the foregoing changes in field intensity or receiving incoming waves that cause various types of fading. This makes it possible to provide useful information to users without interruption.

More specifically, the broadcast station modulates broadcast programs by modulation methods having different error tolerances (such as DQPSK, QPSK, 16QAM, and 64QAM), assigns the same to a plurality of narrowband channels, and transmits them by a multicarrier transmission method for broadband transmission. When receiving the incoming waves that vary in field intensity and/or cause various kinds of fading, the digital broadcast receiving apparatus selects and modulates a modulation signal that is modulated by a modulation method of favorable error tolerance. This makes it possible to provide useful information to users without interruption.

[Patent Document 1] Japanese Patent Application Laid-Open No. 2003-274302

DISCLOSURE OF THE INVENTION

Problems to be Solved by the Invention

By the way, the foregoing conventional digital broadcast receiving apparatus is a digital receiving apparatus capable of the multicarrier transmission method, not a digital receiving apparatus capable of a single-carrier transmission method.

That is, in order to select a modulation signal that is modulated by a modulation method of favorable error tolerance, it is necessary to switch the narrowband channel under reception to another narrowband channel. This digital broadcast receiving apparatus is thus a digital receiving apparatus capable of the multicarrier transmission system, not capable of the single carrier transmission system.

For this reason, when receiving radio waves of different transmission methods (the multicarrier transmission method and the single-carrier transmission method) that are synthesized and transmitted, such as satellite broadcasting and terrestrial broadcasting, it is impossible to exercise the switching function of selecting a modulation signal that is modulated by a modulation method of favorable error tolerance. This means the problem that it is impossible to provide useful information to users without interruption.

Moreover, there is the problem that in order for this conventional digital broadcast receiving apparatus to provide useful information to its users without interruption, new infrastructure must be developed for both the digital broadcast receiving apparatus and broadcast stations.

The present invention has been achieved in view of these conventional problems, and an object thereof is to provide a new digital receiving apparatus which can provide useful information to its users without interruption even when the reception quality deteriorates.

Means for Solving the Problems

The invention according to claim 1 is a digital receiving apparatus comprising: information separating means for reproducing a stream of demodulation signal, and separating it into stream signals on multiplexed respective channels for output; decoding means for decoding and outputting the stream signals;

control means for switching and controlling a stream signal for the decoding means to decode out of the stream signals on the respective channels; and storing means for storing matching information for indicating matching relationship between physical information for indicating reception quality and the data types of the stream signals on the respective channels, wherein the control means determines the matching relationship between the physical information during reception and the data type of the stream signal on a channel selected out of the channels based on the matching information, and switches to the stream signal on another channel and makes the decoding means decode it when the control means determines that the physical information during reception and the data type of the stream signal on the selected channel do not conform to a predetermined relationship.

The invention according to claim 7 is a method of reception of a digital receiving apparatus, comprising: an information separating step of reproducing a stream of demodulation signal, and separating it into stream signals on multiplexed respective channels for output; a decoding step of decoding and outputting the stream signals; a control step of switching and controlling a stream signal for the decoding step to decode out of the stream signals on the respective channels; and a storing step of storing matching information for indicating matching relationship between physical information for indicating reception quality and the data types of the stream signals on the respective channels, wherein in the control step, the matching relationship between the physical information during reception and the data type of the stream signal on a channel selected out of the channels is determined based on the matching information, and the stream signal to be decoded in the decoding step is switched to the stream signal on another channel when it is determined that the physical information during reception and the data type of the stream signal on the selected channel do not conform to a predetermined relationship.

The invention according to an embodiment is a computer program to be executed by a computer arranged in a digital receiving apparatus having: information separating means for reproducing a stream of demodulation signal, and separating it into stream signals on multiplexed respective channels for output; and decoding means for decoding and outputting the stream signals, the computer program comprising a control step of switching to the stream signal on another channel and makes the decoding means decode it when physical information for indicating reception quality during reception and a data type of the stream signal on the channel selected out of the channels do not conform to a predetermined relationship.

The invention according to another an embodiment is a recording medium containing the computer program.

BEST MODE FOR CARRYING OUT THE INVENTION

A digital receiving apparatus according to an embodiment of the present invention will be described with reference to FIG. 1.

Figure 1A:
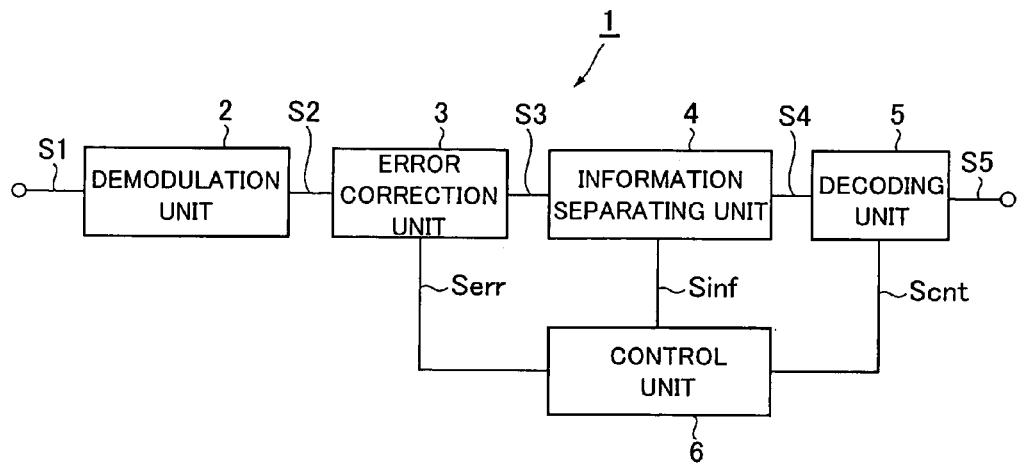
FIG. 1 is a diagram for explaining the configuration and functions of a digital receiving apparatus according to an embodiment of the present invention.
Figure 1B:
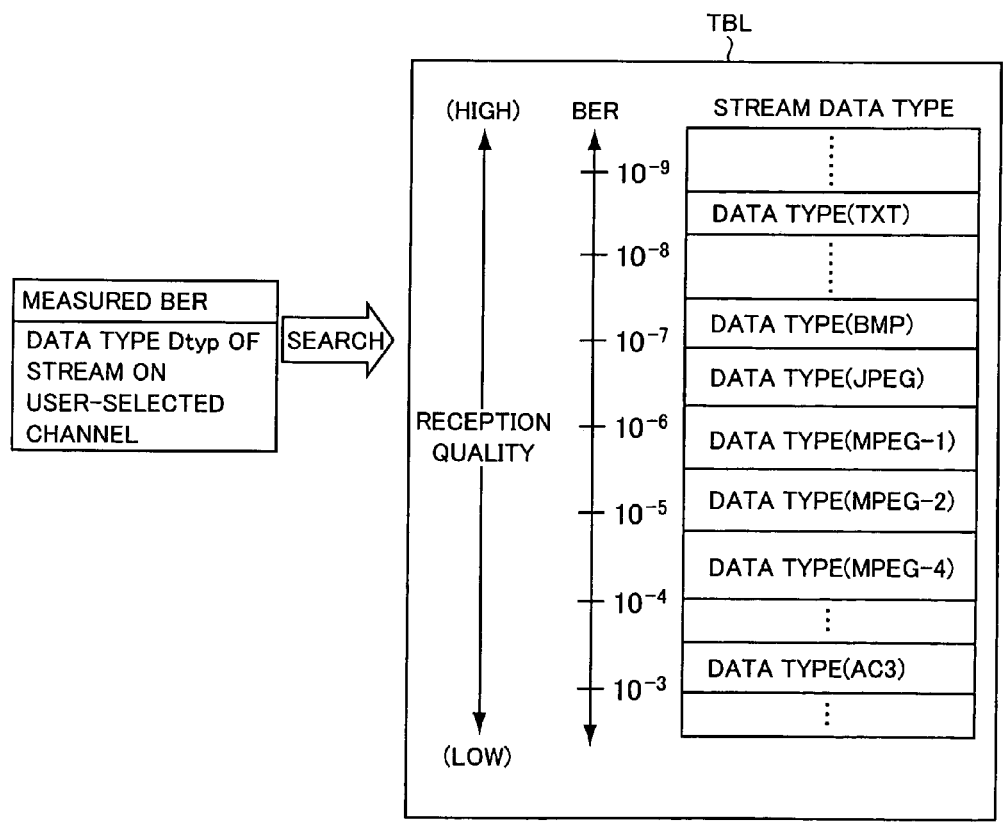

FIG. 1A is a block diagram showing the configuration of this digital receiving apparatus, and FIG. 1B is a diagram for explaining the functions of this digital receiving apparatus.

In FIG. 1A, this digital receiving apparatus 1 has a demodulation unit 2, an error correction unit 3, an information separating unit 4, a decoding unit 5, and a control unit 6.

The demodulation unit 2 demodulates a received modulation signal S1, thereby generating and outputting a demodulation signal S2.

For example, if a tuner unit (not shown) for receiving a digital radio broadcast or a digital television broadcast is connected to the demodulation unit 2, or a receiver for receiving transmission signals transmitted over the Internet or the like is connected to the demodulation unit 2, then the demodulation unit 2 demodulates the modulation signal S1 output from this tuner unit or receiver, modulated by predetermined modulation methods (such as DQPSK, QPSK, 16QAM, and 64QAM), and thereby generates and outputs the demodulation signal S2.

The error correction unit 3 performs error correction on the demodulation signal S2, and outputs the error-corrected demodulation signal S3. When performing the error correction, it also measures the bit error rate (BER) of the demodulation signal S2, and outputs the bit error rate as a reception quality detection signal Serr.

The information separating unit 4 reproduces the stream of the demodulation signal S3, thereby separating it into signals on respective channels such as a video channel, an audio channel, and a text data channel multiplexed in the demodulation signal S3, and outputting them as stream signals S4 on the respective channels.

In other words, since the demodulation signal S3 has the channel structure that a video signal, an audio signal, text data, and the like are multiplexed according to a hierarchical protocol, the information separating unit 4 reproduces the stream of the demodulation signal S3 to separate it into a video stream signal on a video channel, an audio stream signal on the video channel, a text data stream signal on a text data channel, and the like for output.

The information separating unit 4 also determines the data types of the respective stream-reproduced stream signals S4, and outputs data type determination signals Sinf for indicating the data types of the respective stream signals S4. For example, when the stream signals S4 are of respective data types with data compression such as MPEG-1, MPEG-2, MPEG-4, JPEG, and AC-3, or without compression such as TXT and BMP, it determines these data types and outputs the data type determination signals Sinf.

The decoding unit 5 decodes a stream signal that is specified by a switch control signal Scnt supplied from the control unit 6, out of the video, audio, text data, and other stream signals S4 separated channel by channel, thereby restoring and outputting a signal S5 that is yet to be data-compressed.

More specifically, when a video stream signal out of the stream signals S4 is specified by the switch control signal Scnt, the decoding unit 5 performs data decompression processing in conformity to a data compression method such as MPEG-2 and JPEG if the data of the video stream signal is compressed by the data compression method such as MPEG-2 and JPEG. It thereby restores and outputs a video signal S5 that is yet to be data-compressed. Moreover, when an audio stream signal is specified by the switch control signal Scnt, the decoding unit 5 performs data decompression processing in conformity to a data compression method such as AC-3 if the data of the audio stream signal is compressed by the data compression method such as AC-3. It thereby restores and outputs an audio signal S5 that is yet to be data-compressed. Furthermore, if a text data stream signal consists of character code data of noncompression data type, and the text data stream signal is specified by the switch control signal Scnt, then the decoding unit 5 simply outputs the text data stream signal as character code data S5 without performing data decompression processing.

Then, video signals and text data output from the decoding unit 5 are supplied to displaying means (not shown) such as a display to show the images and text. Audio signals are supplied to a speaker system or the like (not shown) for sound reproduction and output.

The control unit 6 instructs which stream signal for the decoding unit 5 to decode out of the stream signals S4 on the plurality of channels output from the information separating unit 4, with the control signal Scnt.

Here, the control unit 6 determines which of the stream signals for the decode unit 5 to decode, based on the following method.

Initially, the control unit 6 has a storing unit (hereinafter, referred to as "data table") TBL such as shown in FIG. 1B, which contains matching data on the matching relationship between individual bit error rates and data types, mapped in the form of a lookup table by associating data indicating the data types suited to the stream signals on the individual channels with respective reference bit error rates (BER) for evaluating reception quality.

When the user operates an operating unit (not shown) to select a desired channel, the control unit 6 detects the data type Dtyp of the stream signal on the selected channel based on the data type determination signal Sinf, and also detects the current bit error rate under reception based on the reception quality detection signal Serr.

Then, it searches the data table TBL for a data type that is associated with a bit error rate (BER) equivalent to the current bit error rate under reception, i.e., the measured bit error rate (BER), and determines whether or not the retrieved data type matches with the foregoing data type Dtyp detected.

Moreover, if the data type retrieved from the data table TBL matches with the data type Dtyp, the control unit 6 determines that a stream signal (or equivalently, channel) of the data type Dtyp conforming to the current reception quality under reception is selected, and controls the decoding unit 5 with the control signal Scnt so as to decode the stream signal on the selected channel.

On the other hand, if the data type retrieved from the data table TBL does not match with the data type Dtyp, the control unit 6 determines that no stream signal (or equivalently, channel) of the data type Dtyp matching with the current reception quality under reception is selected. Then, it searches the data table TBL for a data type that is associated with a bit error rate poorer than the measured bit error rate (BER), i.e., a data type of less deterioration with respect to the measured reception quality, and controls the decoding unit 5 with the control signal Scnt so as to decode the stream signal of the retrieved data type.

For example, when the measurement of the bit error rate (BER) is $10^{-7}$, the control unit 6 controls the decoding unit 5 with the control signal Scnt so as to decode a stream signal of MPEG-4 data type that is associated with a bit error rate poorer than $10^{-7}$ and has higher error tolerance.

As above, reception is switched to another channel if the measured bit error rate (BER) and the data type Dtyp of the stream signal on the channel selected by the user do not conform to the relationship between the bit error rates (BER) and data types stored in the data table TBL. Consequently, even if the reception quality deteriorates, the broadcast programs or the like on the respective channels transmitted from broadcast stations, for example, are provided to the users without interruption under a condition of more favorable reception quality.

As described above, according to the digital receiving apparatus 1 of the present embodiment, whether or not the data type Dtyp of the stream signal under reception matches with a data type stored in the data table TBL is determined based on the bit error rate. If they do not match, so-called channel switching is performed so as to receive the stream signal on another channel. This makes it possible to provide useful information to the users without interruption under a condition of more favorable reception quality.

Moreover, when the reception quality deteriorates, the digital receiving apparatus 1 according to the present embodiment will not select or demodulate a modulation signal that is modulated by a modulation method of favorable error tolerance. Instead, the error correction unit 3 corrects errors of the demodulation signal S2 demodulated by the demodulation unit 2, and the information separating unit 4 reproduces the stream signals S4, which are then subjected to switching processing for so-called channel switching. This makes it possible to provide useful information to the users without interruption regardless of the types of transmission methods such as multi-carrier transmission and single-carrier transmission.

In the present embodiment, whether or not the data type Dtyp of the stream signal under reception matches with a data type stored in the data table TBL is determined based on the bit error rate. If they do not match, so-called channel switching is performed so as to receive the stream signal on another channel. Nevertheless, whether or not the data type Dtyp of the stream signal under reception matches with a data type stored in the data table TBL may be determined based on physical information from which reception quality other than the bit error rate can be detected, such as reception sensitivity.

EXAMPLE

Figure 2A:
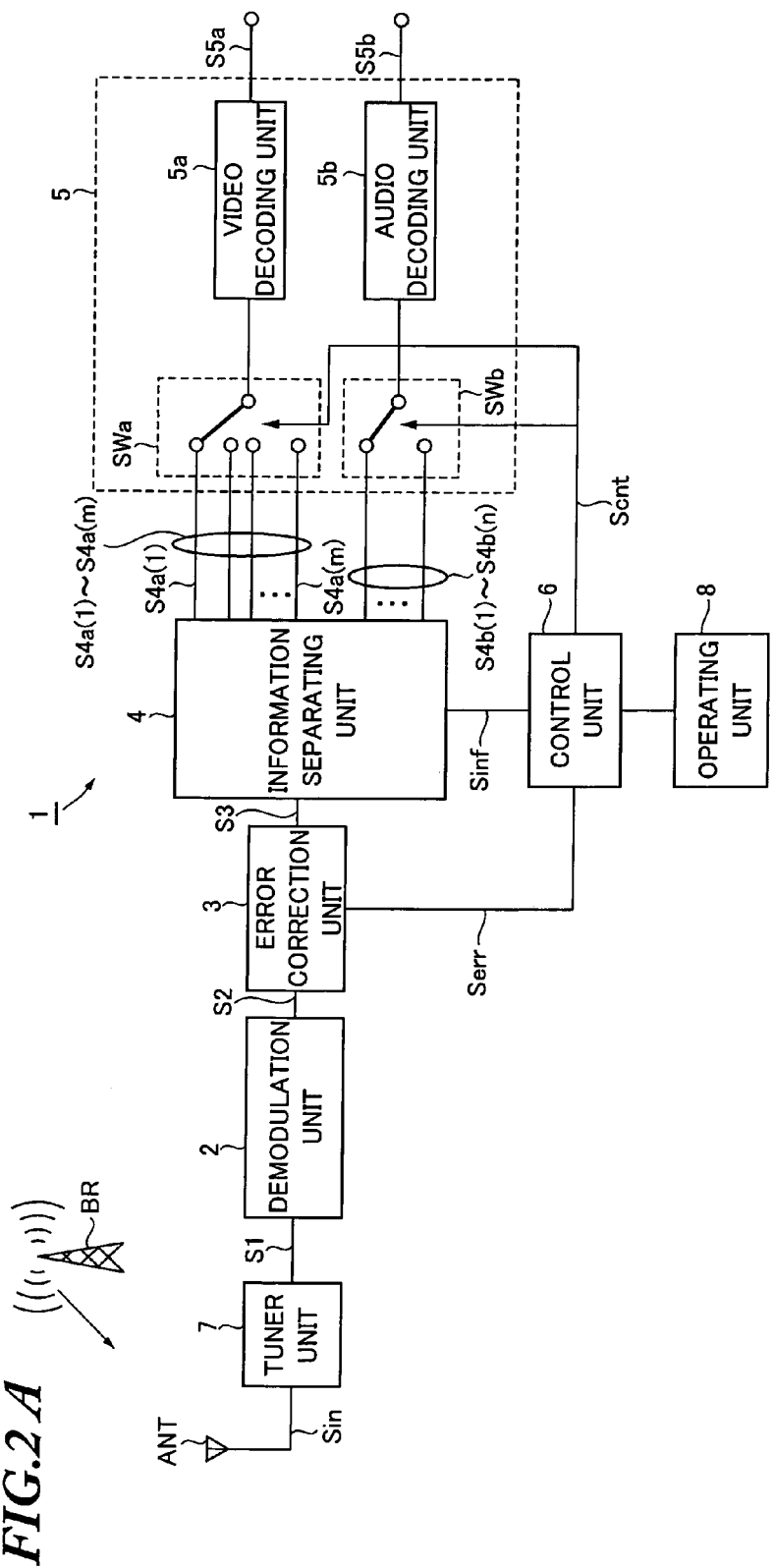
FIG. 2 is a diagram for explaining the configuration of the digital receiving apparatus according to the embodiment.
Figure 2B:
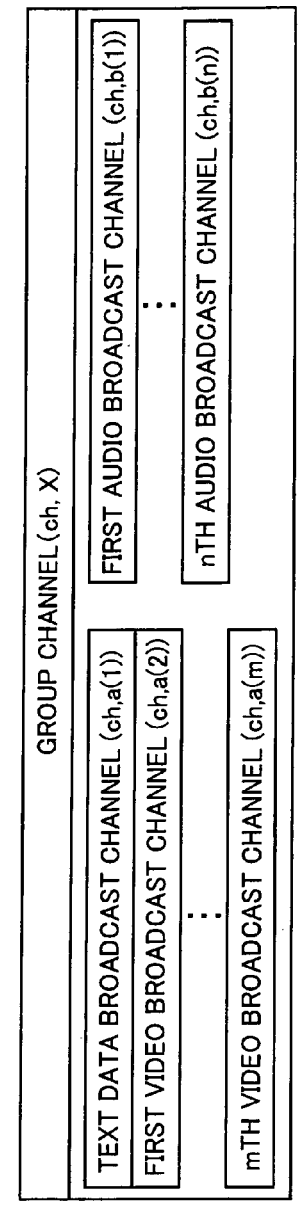
Figure 3:
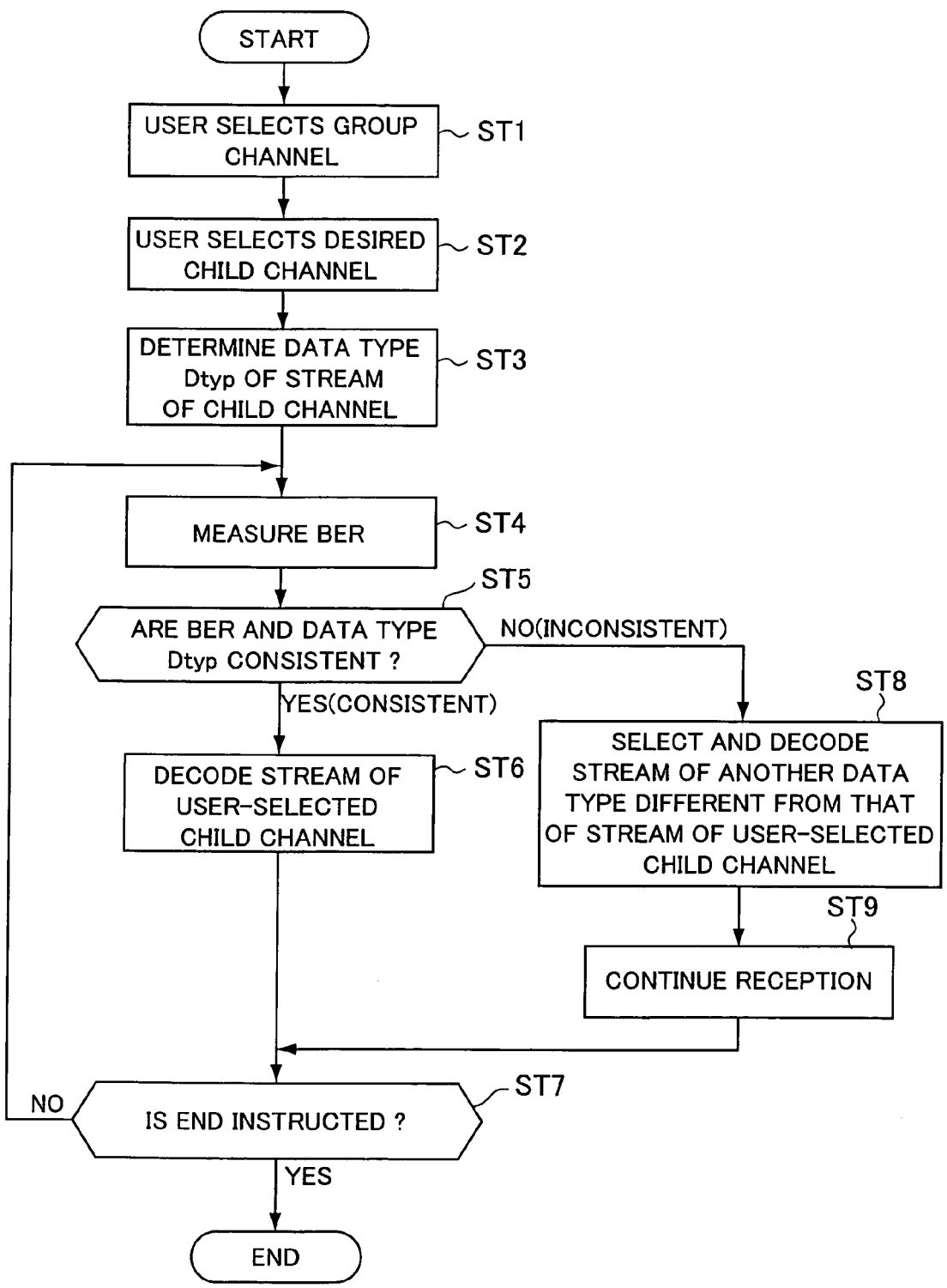
FIG. 3 is a flowchart for explaining the operation of the digital receiving apparatus shown in FIG. 2.

Next, a more concrete example of the digital receiving apparatus will be described with reference to FIGS. 2 and 3. FIG. 2A is a block diagram showing the configuration of the digital receiving apparatus according to the example, in which elements identical or equivalent to those of FIG. 1 will be designated with the same reference numerals. FIG. 2B is a diagram for explaining the structure of broadcast waves of digital radio broadcasting or the like, and FIG. 3 is a flowchart for explaining the operation of this digital receiving apparatus.

In FIG. 2, this digital receiving apparatus 1 is configured to include a tuner unit 7 to which an antenna ANT for receiving broadcast waves transmitted from a digital radio broadcast station BR, as well as a demodulation unit 2, an error correction unit 3, an information separating unit 4, a decoding unit 5, a switch control unit 6, and an operating unit 8.

Here, description will be given of the structure of the broadcast waves transmitted from the broadcast station BR. As shown in FIG. 2B, a plurality of channels including a text data broadcast channel ch.a(1), a plurality of video broadcast channels ch.a(2) to ch.a(m), and a plurality of audio broadcast channels ch.b(1) to ch.b(n) are assigned to a group channel ch.X, and are multiplexed and transmitted in a predetermined transmission frequency band.

Consequently, when the receiving apparatus tunes to and receives the broadcast channel ch.X, it can acquire information on each of the text data broadcast channel ch.a(1), the plurality of video broadcast channels ch.a(2) to ch.a(m), the plurality of audio broadcast channels ch.b(1) to ch.b(n), and the like which are multiplexed.

For convenience of explanation, the text data broadcast channel ch.a(1), the plurality of video broadcast channels ch.a(2) to ch.a(m) the plurality of audio broadcast channels ch.b(1) to ch.b(n), and the like included in the group channel ch.X will be referred to as child channels.

Returning to the configuration of the digital receiving apparatus 1, the tuner unit 7 amplifies a high-frequency reception signal Sin occurring in the antenna ANT, and mixes it with a local oscillation signal having a local oscillation frequency, thereby generating and outputting a frequency-converted modulation signal S1 having intermediate frequencies.

The demodulation unit 2, the error correction unit 3, and the information separating unit 4 have the same configurations and functions as those of the digital receiving apparatus shown in FIG. 1. The demodulation unit 2 demodulates the modulation signal S1, which is modulated by predetermined modulation methods (such as DQPSK, QPSK, 16QAM, and 64QAM), into the demodulation signal S2. The error correction unit 3 corrects errors of the demodulation signal S2 to output the error-corrected demodulation signal S3, and detects the bit error rate (BER) to output the reception quality detection signal Serr. The information separating unit 4 reproduces the stream of the demodulation signal S3, thereby separating the signals on respective channels, such as a video channel, an audio channel, and a text data channel, multiplexed in the demodulation signal S3 into stream signals S4a(1) to S4a(m) and S4b(1) to S4b(n) on the respective channels for output.

That is, when receiving the foregoing group channel ch.X, the information separating unit 4 separates it into the stream signal S4a(1) on the text data broadcast channel ch.a(1), the stream signals S4a(2) to S4a(m) on the video broadcast channels ch.a(2) to ch.a(m) and the stream signals S4b(1) to S4b(n) on the audio broadcast channels ch.b(1) to ch.b(n) for output.

The decoding unit 5 is configured to include: a first switching unit SWa for switching, selecting, and outputting the text data stream signal S4a(1) and the video stream signals S4a(2) to S4a(m) output from the information separating unit 4, according to the instruction of the switch control signal Scnt from the control unit 6; and a second switching unit SWb for switching, selecting, and outputting the audio stream signals S4b(1) to S4b(n) output from the information separating unit 4, according to the instruction of the switch control signal Scnt from the control unit 6. It is also configured to include: a video decoding unit 5a for decompressing data of a stream signal (reference symbol omitted) output from the first switching unit SWa, thereby restoring and outputting a video signal S5a yet to be data-compressed; and an audio decoding unit 5b for decompressing data of a stream signal (reference symbol omitted) output from the second switching unit SWb, thereby restoring and outputting an audio signal S5b yet to be data-compressed.

Note that when the text data stream signal S4a(1) of non-compression data type is supplied thereto, the video decoding unit 5a simply outputs it without performing data decompression processing.

When the user operates the operating unit 8 to select the group channel ch.X and a desired child channel, the control unit 6 instructs the first and second switching units SWa and SWb with the switch control signal Scnt so that the stream signal of the user-selected child channel out of the stream signals S4a(1) to S4a(m) and S4b(1) to S4b(n) is supplied to the video decoding unit 5a or the audio decoding unit 5b.

As with the digital receiving apparatus of the foregoing embodiment, the control unit 6 also inputs the data type determination signal Sinf which indicates the data types of the respective stream signals S4a(1) to S4a(m) and S4b(1) to S4b(n), and the reception quality detection signal Serr which indicates the bit error rate (BER).

The control unit 6 is also provided with a data table TBL such as shown in FIG. 1B, which contains matching data in which bit error rates (BER) and various data types are matched and associated with each other.

Next, the operation of the digital receiving apparatus 1 having the foregoing configuration will be described with reference to FIG. 3.

In FIG. 3, when the user operates the operating unit 8 to select a desired group channel ch.X (step ST1) and select a desired child channel further (step ST2), the tuner unit 7 turns to this group channel ch.X and starts reception, and the information separating unit 4 outputs the stream signals S4a(1) to S4a(m) and S4b(1) to S4b(n) on the child channels ch.a(1) to ch.a(m) and ch.b(1) to ch.b(n).

Next, the control unit 6 determines the data types of the stream signals S4a(1) to S4a (m) and S4b(1) to S4b(n) (step ST3), and then measures the bit error rate (step ST4).

Next, the control unit 6 determines whether or not the measured bit error rate (BER) and the data type Dtyp of the stream signal on the child channel selected by the user conform to the relationship between the bit error rates (BER) and the data types stored in the data table TBL.

More specifically, as described with reference to FIG. 1B, it searches the data table TBL for a data type that is associated with a bit error rate (BER) equivalent to the measured bit error rate (BER), and determines whether or not the retrieved data type matches with the foregoing data type Dtyp detected.

If they match, it moves to step ST6. If they do not match, it moves to step ST8.

Then, at step ST6, it determines that the data type Dtyp of the stream signal (or equivalently, child channel) conforming to the current reception quality under reception is selected, and controls the decoding unit 5 to decode the stream signal on the child channel selected by the user. Next, at step ST7, it determines whether or not the end of reception is instructed by the user. If the end is instructed, it ends processing. If the end is not instructed, it repeats the processing from step ST4.

Next, when moved to step ST8, it selects the stream signal of another data type (or equivalently, another child channel) different from the data type of the stream on the child channel selected by the user.

More specifically, the control unit 6 searches the data table TBL for a data type that is associated with a bit error rate poorer than the measured bit error rate (BER), i.e., a data type of less deterioration with respect to the measured reception quality, and controls the decoding unit 5 with the control signal Scnt so that the stream signal of the retrieved data type is decoded.

Here, it searches the data table TBL for a data type of the least deterioration among those stored in the data table TBL as the data type of less deterioration, and makes the stream signal on the retrieved data type decoded.

Next, at step ST9, the current state of reception is maintained while the control unit 6 returns via step ST7 to step ST4 so that the reception processing is repeated.

Then, the stream signal is switched to that of another data type at step ST8. Subsequently, if the control unit 6 determines that the measured bit error rate (BER) and the data type Dtyp of the stream signal on the user-selected child channel finally conform to the relationship between the bit error rates (BER) and the data types stored in the data table TBL, it returns to the original stream signal selected by the user, makes the decoding unit 5 decode it, and continues the reception processing.

As described above, according to the digital receiving apparatus 1 of the example, a deterioration in reception quality is measured in terms of the bit error rate, and so-called channel switching is performed so as to receive the stream signal on another channel when the data type Dtyp on the stream signal under reception does not match with the data types stored in the data table TBL. This makes it possible to provide useful information to the user without interruption under a condition of more favorable reception quality.

When the reception quality deteriorates, the digital receiving apparatus 1 according to the example will not select or demodulate the modulation signal modulated by a modulation method of favorable error tolerance. Instead, the error correction unit 3 corrects errors of the demodulation signal S2 demodulated by the demodulation unit 2, and the information separating unit 4 reproduces stream signals, which are then subjected to switching processing for so-called channel switching. It is therefore possible to provide useful information to the user without interruption regardless of the types of transmission methods such as multi-carrier transmission and single-carrier transmission.

Note that in the digital receiving apparatus of the example described above, the data type of the least deterioration among those stored in the data table TBL is retrieved from the data table TBL as the data type of less deterioration at step ST8 in FIG. 3. Nevertheless, the correspondence between bit error rates and data types when selecting the data type of less deterioration may be established in advance so that the data type of less deterioration is retrieved depending on the correspondence.

Moreover, the control unit 6 may be made of a microprocessor (MPU) or the like so that a computer program for realizing the control operation of the control unit 6 described above is practiced by the microprocessor.

This computer program may also be recorded on a recording medium such as a CD and a DVD, and installed on and practiced by the foregoing microprocessor.

In addition, the correspondence between the various data types and bit error rates stored in the data table TBL shown in FIG. 2B may be modified by the user when necessary. Data of new data types may also be stored.

The invention claimed is:

1. A digital receiving apparatus comprising:
   a measuring unit for measuring a physical information of a stream of demodulation signal, the physical information indicating a reception quality;
   an information separating unit for reproducing the stream of the demodulation signal, separating it into stream signals on multiplexed respective channels for output, and determining data compression types of the stream signals, the data compression types indicating data types with and without compression;
   a decoding unit for decoding and outputting said stream signals;
   a control unit for switching and controlling a stream signal for the decoding unit to decode out of the stream signals on said respective channels; and
   a storing unit for storing matching information for indicating matching a relationship between the physical information and the data compression types of the stream signals on the respective channels,
   wherein said control unit determines the matching relationship between said measured physical information and the determined data compression type of the stream signal on a channel selected out of said channels based on said matching information, and
   switches to the stream signal on another channel and makes said decoding unit decode it when the control unit determines that said physical information and the determined data compression type of the stream signal on said selected channel do not conform to a predetermined relationship.

2. The digital receiving apparatus according to claim 1, wherein the stream signal on said another channel is a stream signal of a data compression type different from the data compression type of the stream signal on said selected channel.

3. The digital receiving apparatus according to claim 1, wherein the stream signal on said another channel has a data compression type conforming to the predetermined relationship with said physical information.

4. The digital receiving apparatus according to claim 1, wherein said physical information is a bit error rate.

5. The digital receiving apparatus according to claim 1, wherein
   when said control unit determines that said physical information and the data compression type of the stream signal of said selected channel do not conform to the predetermined relationship, the control unit searches for a stream signal on said another channel, having a data compression type conforming to the predetermined relationship with said physical information, based on said matching information, and switches to the stream signal on said different channel based on a search result.

6. A method of reception of a digital receiving apparatus, comprising:
   a measuring step of measuring a physical information of a stream of demodulation signal, the physical information indicating a reception quality;
   an information separating step of reproducing a stream of demodulation signal, separating it into stream signals on multiplexed respective channels for output, and determining data compression types of the stream signals, the data compression types indicating data types with and without compression;
   a decoding step of decoding and outputting said stream signals;
   a control step of switching and controlling a stream signal for said decoding step to decode out of the stream signals on said respective channels; and
   a storing step of storing matching information for indicating matching relationship between physical information and the data compression types of the stream signals on the respective channels,
   wherein in the control step, the matching relationship between said physical information and the data compression type of the stream signal on a channel selected out of said channels is determined based on said matching information, and
   the stream signal to be decoded in said decoding step is switched to the stream signal on another channel when it is determined that said physical information and the data compression type of the stream signal on said selected channel do not conform to a predetermined relationship.

7. A non-transitory computer readable recording medium embodied with a computer program of machine readable instructions, executable by a computer arranged in a digital receiving apparatus, the computer program comprising:
   a measuring step of measuring a physical information of a stream of demodulation signal, the physical information indicating a reception quality;
   an information separating step of reproducing a stream of demodulation signal, separating it into stream signals on multiplexed respective channels for output, and determining data compression types of the stream signals, the data compression types indicating data types with and without compression;
   a decoding step of decoding said stream signals;
   a control step of switching and controlling a stream signal for said decoding step to decode out of the stream signals on said respective channels; and
   a storing step of storing matching information for indicating matching relationship between physical information and the data compression types of the stream signals on the respective channels,
   wherein in said control step,
   the matching relationship between said physical information and the data type of the stream signal on a channel selected out of said channels is determined based on said matching information, and
   the stream signal to be decoded in said decoding step is switched to the stream signal on another channel when it is determined that said physical information and the data compression type of the stream signal on said selected channel do not conform to a predetermined relationship.

* * * * *